Figures 1, 2:
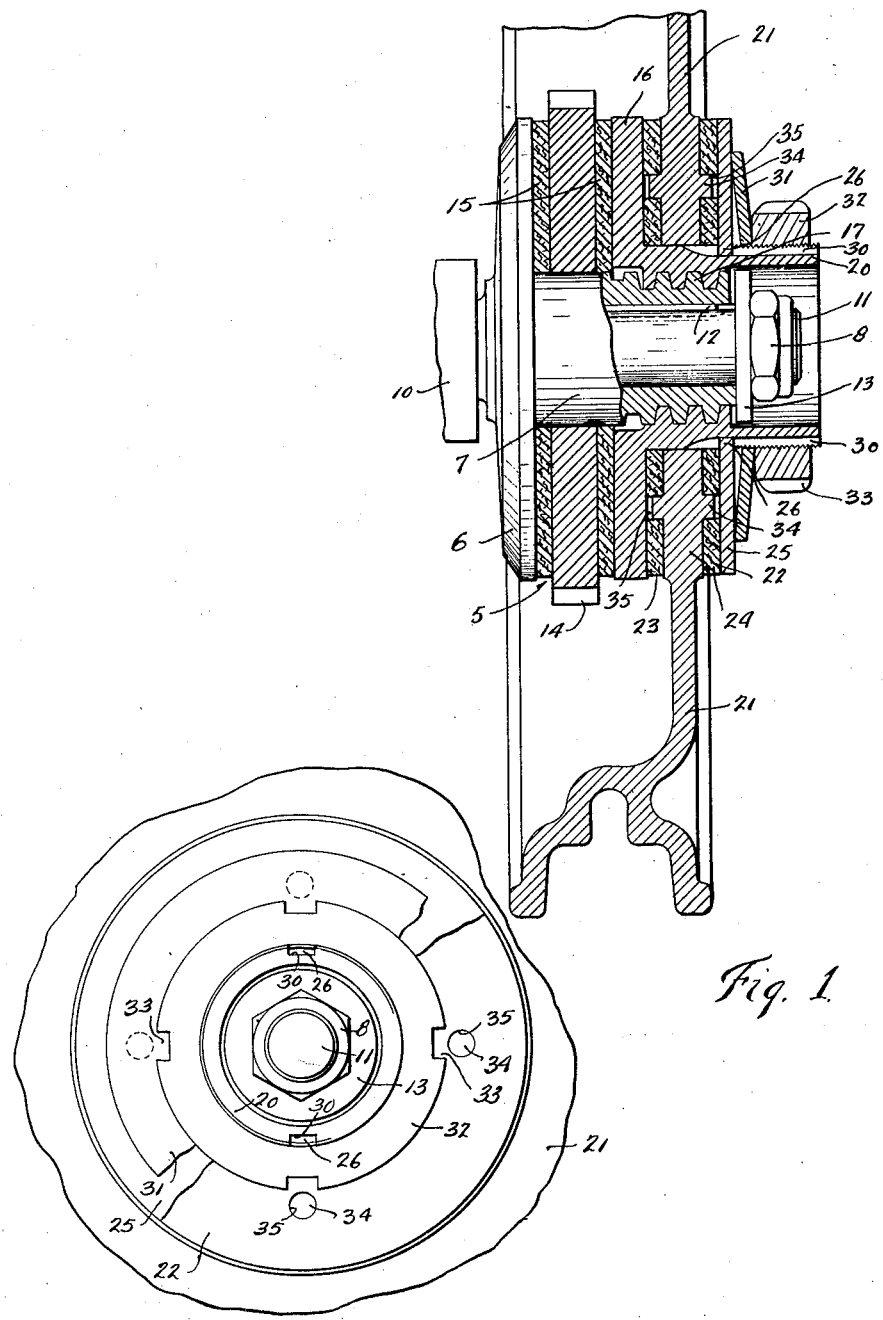

March 21, 1950 E. E. ROBINS ET AL 2,501,096
CLUTCH AND BRAKE FOR HOISTS
Filed June 26, 1947

INVENTORS
Erford E. Robins and Humphrey F. Parker
BY
Bean, Brooks, Buckley & Bean
ATTORNEYS Patented Mar. 21, 1950

2,501,096

UNITED STATES PATENT OFFICE 2,501,096

CLUTCH AND BRAKE FOR HOISTS

Erford E. Robins, North Tonawanda, and Humphrey F. Parker, Buffalo, N. Y., assignors to Columbus McKinnon Chain Corporation, Tonawanda, N. Y., a corporation of New York Application June 26, 1947, Serial No. 757,176

8 Claims. (Cl. 192—15)

Our invention relates in general to hoists and in particular to safety devices for use upon such hoists to limit the maximum weight of the load which can be lifted thereby.

The principal object of our invention has been to provide a safety device of compact design, which is adapted to be used in connection with the "Weston" brake of the hoist and which does not therefore materially increase the size of the hoist.

Another object has been to provide a clutch type safety device which is normally held in operative position by spring means, thereby making it convenient to adjust the device to vary the maximum load which can be lifted by the hoist.

Moreover, our device is designed so as to be sturdy in construction and durable in operation.

These and other objects, which will be apparent to those skilled in the art, have been accomplished by the device shown in the accompanying drawings, of which:

Fig. 1 is a fragmentary sectional view of a hoist embodying our invention taken through the centerline thereof; and Fig. 2 is a fragmentary front elevation of the same.

While our invention is applicable to hoists of any type employing a "Weston" brake, for convenience of illustration, we have shown it as applied to a hand operated hoist.

As hereinbefore pointed out, our invention is adapted for use in connection with a "Weston" brake, in order that a compact design and arrangement of parts may be achieved. As shown in Fig. 1, 5 represents the usual "Weston" brake having the customary friction flange 6 which carries the hub 7 of the brake. In Fig. 1, a fragmentary portion of the bearing boss 10 for the operating shaft 11 is shown. As is customary, the hub 7 of the brake is mounted upon the hoist operating shaft 11, a suitable key 12 being provided between the hub and the shaft to mount the hub upon the latter element in non-rotative manner. An operating shaft nut 8 is screw-threaded to the outer end of the shaft and serves to hold the hub and friction flange in position upon the shaft. A detent washer 13 is disposed between the nut and the ends of the hub and shaft for purposes to be hereinafter described. The ratchet wheel of the "Weston" brake is represented at 14 and cooperates with the usual ratchet pawl (not shown). On each side of the ratchet wheel is disposed the usual friction disk 15 of the brake.

The opposite friction flange 16 of the brake is formed as a part of a sleeve 20, and the sleeve is mounted upon the screw-threads 17 usually forming the hub 7 of the brake. Relative rotation of the sleeve upon the hub and the resulting axial movement thereof causes the brake to be operated in customary manner.

The hand chain wheel 21 of the hoist is provided with a disk 22 which is rotatably mounted upon the sleeve 20. A friction washer 23 is mounted in a space between the disk and the friction flange 16, and a friction washer 24 is mounted on the opposite side of the disk 22. A thrust washer 25 is mounted upon the sleeve 20 and formed with oppositely arranged key tabs 26 for sliding and non-rotative engagement with the keyways 30 formed in the sleeve 20. This thrust washer is forced against the friction washer 24 and in turn against the disk 22, friction washer 23, and friction flange 16 by means of a spring washer 31. This spring washer is mounted upon the sleeve and is forced resiliently against the thrust washer 25 by means of an adjusting nut 32 mounted upon the screw-threaded outer end of the sleeve. The nut is preferably provided with a plurality of notches 33 for the reception of a suitable spanner wrench (not shown).

The disk 22 of the hand wheel is provided with a plurality of detent pins 34 arranged preferably upon the opposite sides thereof and equidistantly spaced. These pins project beyond the opposite faces of the disk and are engaged with detent apertures 35 formed in the friction washers 23 and 24, whereby the washers and hand wheel disk will be rotated in unison. The detent washer 13 is so proportioned that it will act as a stop for the sleeve to prevent it from becoming detached from the hub 7 of the brake.

From the foregoing it will be obvious that the hand wheel is frictionally held upon the hub in its operative relation by means of the tension produced by the spring washer 31. When the hoist equipped with our device is initially assembled, the tension on the spring washer is adjusted to produce sufficient pressure upon the friction washers to cause the hoist to sustain a load which is substantially 50% more than the full load for which the hoist is designed. Under these conditions, if a load in excess of the predetermined maximum is placed upon the hoist, slippage will occur between the friction washers 23 and 24 and the friction flange 16 and thrust washer 25, thereby protecting the hoist from such an overload which would cause breakage or damage to any part of the hoist.

Obviously, some modifications of the details herein shown and described may be made without departing from the spirit of our invention or the scope of the appended claims, and we do not therefore wish to be limited to the exact embodiment herein shown and described.

What is claimed is:

1. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges, and a friction disc disposed in each of the spaces between the friction flanges and the opposite faces of said ratchet wheel, of a safety device, comprising a hand-chain wheel rotatably mounted upon said sleeve for normal rotation therewith, and yieldable friction means connecting said hand wheel with said sleeve to permit relative rotation of said wheel and sleeve under predetermined overload conditions.

2. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges and a friction disc disposed in each of the spaces between the friction flanges and the opposite faces of said ratchet wheel, of a safety device, comprising a hand-chain wheel rotatably mounted upon said sleeve and co-acting with said opposed friction flange to rotate the same under normal conditions, and yieldable means carried by said sleeve to frictionally engage said hand-wheel with said opposed friction flange to permit relative rotation of said hand wheel and the last mentioned flange under predetermined overload conditions.

3. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges, and a friction disc disposed in each of the spaces between the friction flanges and the opposite faces of said ratchet wheel, of a safety device, comprising a hand-chain wheel rotatably mounted on said sleeve, a central disc member carried by said hand wheel and arranged in spaced relation to said opposed friction flange, a thrust washer non-rotatably mounted upon said sleeve in spaced relation to said disc member, a friction washer disposed within the space on each side of said disc member, and spring means carried by said sleeve for forcing the washers and said member into frictional contact with each other and with said opposed friction flange.

4. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges, and a friction disc disposed in each of the spaces between the friction flanges and the opposite faces of said ratchet wheel, of a safety device, comprising a hand-chain wheel rotatably mounted upon said sleeve, a single disc member carried by said hand-wheel and arranged in spaced relation to said opposed friction flange, a thrust washer non-rotatably mounted upon said sleeve in spaced relation to said disc member, a friction washer disposed within the space on each side of said disc member, detent pins carried by said disc member and engageable with detent apertures formed in said disc washers, and spring means carried by said sleeve for forcing the washers and said member into frictional contact with each other and with said opposed friction flange.

5. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges, and a friction disc disposed in each of the spaces between the friction flanges and the opposite faces of said ratchet wheel, of a safety device, comprising a hand-chain wheel rotatably mounted upon said sleeve and rotatable therewith under normal load conditions, friction means carried by said sleeve and engageable with said hand wheel and said opposed friction flange, a spring washer mounted upon said sleeve, and an adjusting nut screw-threaded to said sleeve for maintaining said friction means in driving relation to said opposed friction flange and said hand wheel.

6. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges and a friction disc disposed in each of the spaces between the friction flanges and the opposite faces of said ratchet wheel, of a safety device, comprising a hand-chain wheel rotatably mounted upon said sleeve and rotatable therewith under normal load conditions, a friction washer located on each side of said hand wheel, a thrust washer non-rotatably carried on said sleeve for bearing contact with one of said friction washers, a spring washer mounted on said sleeve adjacent to one of said washers, and adjusting means carried by said sleeve for regulating the tension of said spring washer.

7. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges, and a friction disc disposed in each of the spaces between the friction flanges and the opposite faces of said ratchet wheel, of a safety device, comprising a hand-chain wheel rotatably mounted upon said sleeve and rotatable therewith under normal load conditions, a friction washer on each side of said hand-wheel, detent pins carried by said handwheel and engageable with registering apertures formed in said friction washers to cause unison rotation of said wheel and said washers, a thrust washer non-rotatably carried by said sleeve for bearing contact with one of said friction washers, a spring washer mounted on said sleeve adjacent one of said friction washers, and adjusting means carried by said sleeve for regulating the tension of said spring washer.

8. The combination with a hoist having an operating shaft, a screw-threaded hub non-rotatably carried by said shaft, a friction flange fixed to said hub, an opposed friction flange rotatably mounted upon said hub, a screw-threaded sleeve rigidly carried by said opposed friction flange and mounted upon the threaded portion of said hub to move the friction flanges toward and away from each other, a ratchet wheel rotatably mounted upon the hub and in spaced relation with the friction flanges, and a friction disc disposed in each of the spaces between the friction flanges and the opposite faces of said ratchet wheel, of a safety device, comprising a hand-chain wheel rotatably mounted upon said sleeve and rotatable therewith under normal load conditions, friction means carried by said sleeve and engageable with said hand-wheel and said opposed friction flange, a spring washer mounted upon said sleeve, an adjusting nut screw-threaded to said sleeve and bearing against said spring washer for maintaining said friction means in driving relation with said opposed friction flange and said hand-wheel, a shaft nut mounted upon said shaft for retaining said hub in fixed axial relation with said shaft, a washer disposed between said shaft nut and said hub, said washer being so proportioned as to act as a detent for said sleeve to retain it in operative relation with said hub.

ERFORD E. ROBINS.
HUMPHREY F. PARKER.

REFERENCES CITED

The following references are of record in the file of this patent:

UNITED STATES PATENTS

| Number | Name | Date |
|---|---|---|
| 424,383 | Walker | Mar. 25, 1890 |
| 975,559 | Metcalf et al. | Nov. 15, 1910 |
| 1,112,331 | Sessions | Sept. 29, 1914 |
| 1,427,025 | Schlafly | Aug. 22, 1922 |
| 1,833,648 | Johnson | Nov. 24, 1931 |